United States Patent [19]

Jung

[11] Patent Number: 5,205,486
[45] Date of Patent: Apr. 27, 1993

[54] CONTROL DEVICE FOR COMBUSTION APPARATUS AND METHOD FOR CONTROLLING THE SAME

[75] Inventor: Jae-Hwan Jung, Suwon, Rep. of Korea

[73] Assignee: Samsung Electronics Co., Ltd., Suweon, Rep. of Korea

[21] Appl. No.: 818,905

[22] Filed: Jan. 10, 1992

[30] Foreign Application Priority Data

Jan. 31, 1991 [KR] Rep. of Korea ................. 91-1682

[51] Int. Cl.$^5$ ............................................. G05D 27/00
[52] U.S. Cl. ................................... 236/94; 431/14; 374/183; 395/61
[58] Field of Search ................. 374/183; 364/557; 395/61, 900; 236/94; 431/14

[56] References Cited

U.S. PATENT DOCUMENTS

4,606,401  8/1986  Levine et al. .................. 236/94 X
4,898,229  2/1990  Brown et al. .................. 236/94 X

FOREIGN PATENT DOCUMENTS

63-70024  3/1988  Japan .
63-87525  4/1988  Japan .
63-87526  4/1988  Japan .

*Primary Examiner*—William E. Wayner
*Attorney, Agent, or Firm*—Burns, Doane, Swecker & Mathis

[57] ABSTRACT

A control device for a combustion apparatus, which can detect failure of components and a method for controlling the combustion apparatus are disclosed. More particularly to a control device and a method for a combustion apparatus utilizing fuzzy logic reasoning in order to maintain accurate temperature control are disclosed.

6 Claims, 3 Drawing Sheets

CONTROL DEVICE FOR COMBUSTION APPARATUS AND METHOD FOR CONTROLLING THE SAME

BACKGROUND OF THE INVENTION

1. Field of the Invention

The present invention relates to a control device for a combustion apparatus, which can detect component failure and a method for controlling the combustion apparatus, and more particularly to a control device for a combustion apparatus, specifically utilizing fuzzy logic reasoning, which can prevent malfunction of the combustion apparatus by detecting variation in the properties of a room temperature sensor or similar components, as well as variation of the power supply voltage so that accurate temperature control can be achieved.

2. Description of the Prior Art

Generally, combustion apparatuses such as gas heaters, kerosine heaters and the like are used indoors. Thus, attempts have been made to eliminate odors caused by incomplete combustion through the improvement of the combustion, and to prevent accidents caused by oxygen deficiency in a closed space.

For example, in Japanese laid open patent application No. Sho 63-87525 entitled, "Control Circuit for Kerosine Combustion Apparatus" and Japanese laid open patent application No. Sho 63-87526 entitled, "Control Circuit for Kerosine Combustion Apparatus," in order to improve combustion and remove odors, control is achieved in such a manner that air for combustion is provided when the temperature reaches a predetermined value by detecting the temperature of the burner body heated by the evaporation heater, and the operating period of the burner motor is controlled depending upon room temperature together with supplying an appropriate quantity of fuel.

Also, Japanese laid open patent application No. Sho 63-70024 entitled, "Control Circuit for Kerosine Combustion Apparatus" discloses that the deficiency of oxygen in a closed space can be detected by detecting the drop in the temperature of the burner body. If the temperature is lower than the predetermined temperature combustion stops, thereby preventing accidents.

In other prior art, many inventions have also been made to supply the proper quantity of air depending upon the temperature of the heated air.

However, such control devices for a combustion apparatus control combustion on the basis of the temperature detected by a sensor, for example, a thermistor. Thus, when the variation in the properties of a temperature sensor occurs, complete control for the combustion apparatus cannot be obtained since such control is made only on the basis of the result of the comparison of the temperature detected by the sensor with that stored in a microprocessor.

Also, in the conventional combustion apparatus, if complete combustion control is not achieved, combustion efficiency deteriorates.

Accordingly, it is an object of the present invention to provide a control device for a combustion apparatus which can accurately detect and control the temperature and prevent malfunction of the apparatus due to the variation of components such as a thermistor by performing a fuzzy logic operation on the basis of the data obtained by the temperature sensors and data stored in a microprocessor corresponding to each controlling step.

It is another object of the present invention to provide a method for controlling a combustion apparatus which can accurately detect and control the temperature and prevent malfunction of the apparatus due to the variation of components such as a thermistor, by performing a fuzzy logic operation on the basis of the data obtained by temperature sensors and data stored in a microprocessor corresponding to each controlling step.

SUMMARY OF THE INVENTION

In accordance with one aspect of the present invention, there is provided a control device for a combustion apparatus, by which accurate temperature control can be achieved even when the variation of temperature data detected by temperature sensors due to the variation of properties or failure of components occurs, the control device comprising:

a microprocessor for processing temperature data and control data to control peripheral devices;

input means for inputting temperature data into the microprocessor;

temperature sensor for detecting current temperature for a predetermined time period, which is connected to the microprocessor;

power supply means for providing voltage to operate the combustion apparatus;

display means for displaying the current temperature detected by the sensor and the desired temperature input by user;

combustion control means for controlling combustion on the basis of the desired temperature input by the user and the current temperature, and voltage detecting means for detecting the voltage from the power supply.

In accordance with another aspect of the present invention there is provided a method for controlling a combustion apparatus which achieves accurate temperature control, the method comprising the steps of:

inputting a predetermined temperature into a microprocessor by a user after the microprocessor is initialized and voltage from power supply is detected;

determining variation in power supply voltage by comparing the voltage from the power supply with a reference voltage value stored in the microprocessor;

determining a fuzzy correlation by comparing the variation in the room temperature which is stored in the microprocessor with the temperature which is stored in the microprocessor with the temperature variation over a predetermined time period; and displaying the operating state of the combustion apparatus on a display which corresponds to the variation of the voltage or the fuzzy correlation.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
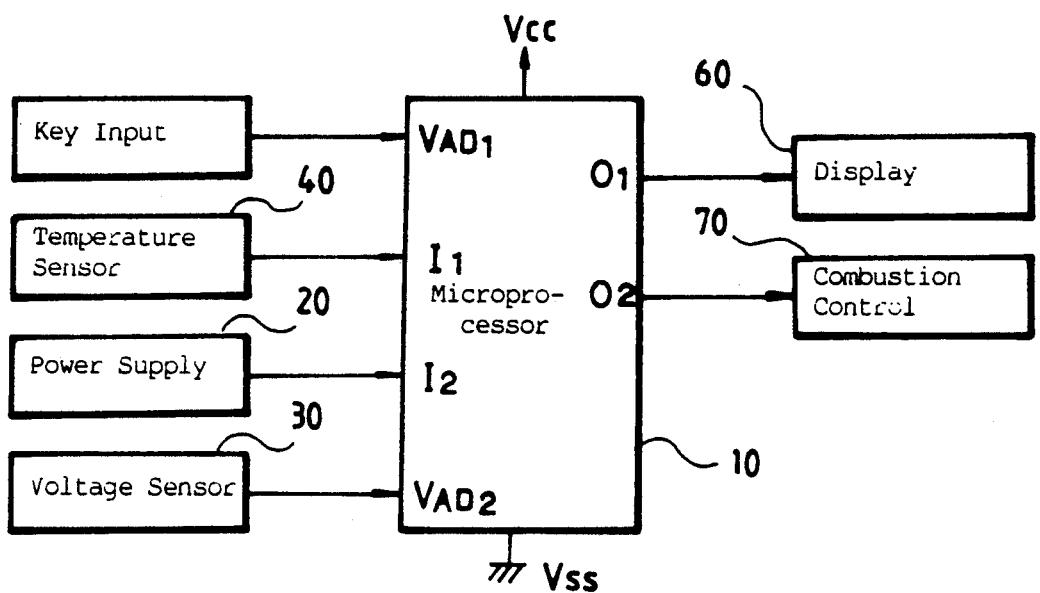
FIG. 1 is a block diagram of a control device for a combustion apparatus in accordance with the present invention.

FIG. 1 illustrates a schematic block diagram of a control device for a combustion apparatus not shown. A microprocessor 10 comprises a key input 50 connected to input $V_{AD1}$ to set a predetermined selected by a user. The microprocessor 10 incorporates all the reference data, for example component properties, the reference voltage, etc., to compare with the data input from sensors, or a detector. A temperature sensor 40 is connected to an input $I_1$, to measure the temperature in a room. A power supply 20 is connected to an input $I_2$, to provide power to microprocessor 10. A display 60, comprising, for example, LEDs or LCDs or the like, is connected to an output $O_1$ to show the temperature measured by temperature sensor 40 and the predetermined temperature set by the user. A combustion control 70 is connected to output $O_2$ to control the combustion state in accordance with the temperature difference between the temperature measured by temperature sensor 40 and the predetermined temperature set by the user. A voltage sensor 30 is connected to an input $V_{AD2}$ to provide voltage data to microprocessor 10. Therefore, the microprocessor 10 detects the variation in the voltage from power supply 20 in comparison with the reference voltage level stored in the microprocessor.

Figure 2:
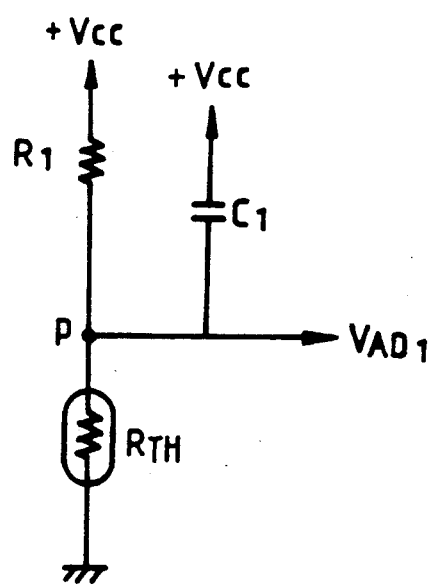
FIG. 2 is an electrical schematic of a circuit for temperature sensor.

FIG. 2 illustrates a detailed circuit diagram of temperature sensor 40. The temperature sensor $R_{TH}$, for example, thermistor, is connected to a voltage source $+V_{cc}$ through a resistor $R_1$ and the other end of temperature sensor $R_{TH}$ is connected to ground. An input $V_{AD1}$ of an analog to digital convertor incorporated with in the microprocessor 10, is connected to a junction P between resistor $R_1$ and temperature sensor $R_{TH}$. Also, a capacitor $C_1$, one end of which is connected to a voltage source $+V_{cc}$, is connected between junction P and input $V_{AD1}$. The analog to digital convertor in microprocessor 10 converts analog data from temperature sensor $R_{TH}$ into digital data.

Figure 3:
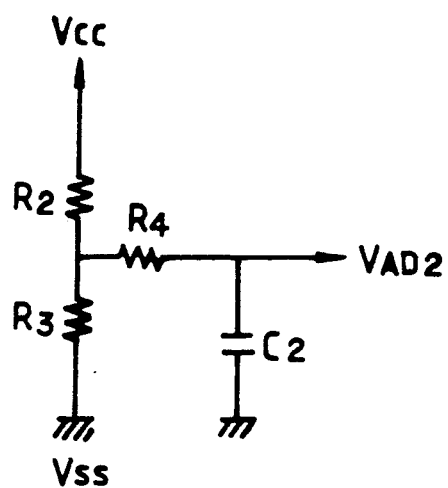
FIG. 3 is a block diagram showing in more detail the voltage sensor of the control device of the combustion apparatus.

FIG. 3 illustrates a voltage sensor 30 of the control device for a combustion apparatus. Resistor $R_2$ and $R_3$ are connected in series to a voltage source $V_{cc}$. The other end of resistor $R_3$ is grounded. A resistor $R_4$, one end of which is connected between resistors $R_2$ and $R_3$, is connected to an input $V_{AD2}$ of the analog to digital convertor, also incorporated in microprocessor 10. A capacitor $C_2$, one end of which is connected to ground, is connected between resistor $R_4$ and input $V_{AD2}$.

Figure 4:
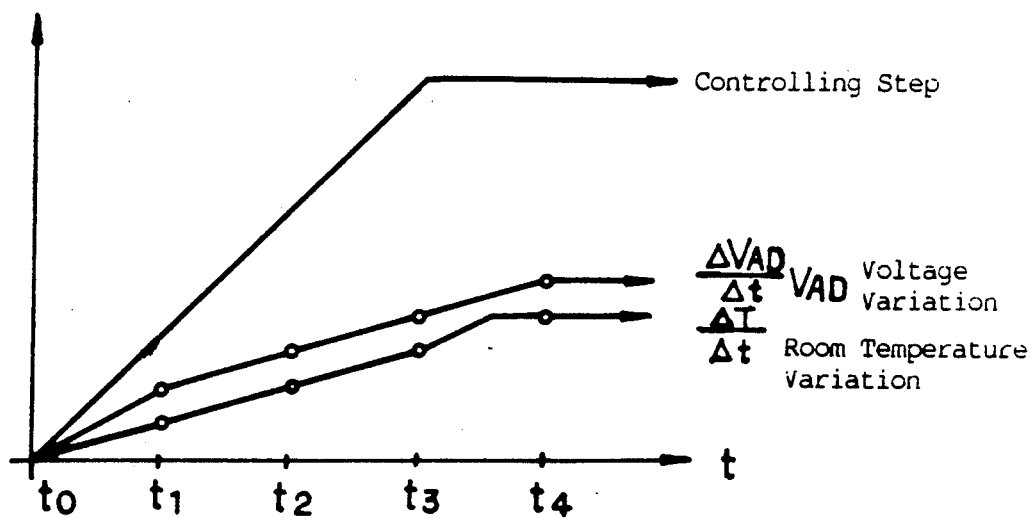
FIG. 4 is a graph showing room temperature variation, controlling steps, and voltage variation over time.

FIG. 4 illustrates a graph which shows variation in the temperature over time, $\Delta V_{ad}/\Delta tn:B_n$, of the temperature detected by the temperature sensor 40 shown in FIG. 1, controlling steps corresponding to time from the lowest combustion state to the highest combustion state, and voltage variation depending upon time and room temperature variation per unit time, $\Delta T/\Delta t_1:T$, stored in microprocessor 10. On the basis of the graph illustrated in FIG. 4, a control rule as shown Table 1 below is obtained. By performing a fuzzy logic operation in accordance with the fuzzy correlation shown in Table 2 below, it is determined whether the temperature data from temperature sensor 40 deviates from the normal operation range.

TABLE 1

| RULE NO. | Control Rule | |
|---|---|---|
| 1 | $\Delta T/t_1 = T_1$ | $\Delta V_{AD}/t_1 = B_1$ |
| 2 | $\Delta T/t_2 = T_2$ | $\Delta V_{AD}/t_2 = B_1$ |
| 3 | $\Delta T/t_1 = T_3$ | $\Delta V_{AD}/t_3 = B_1$ |
| 4 | $\Delta T/t_1 = T_4$ | $\Delta V_{AD}/t_3 = B_1$ |

TABLE 2

| $B_n T_m$ | Fuzzy Correlation Matrix | | | |
|---|---|---|---|---|
| | $T_1$ | $T_1$ | $T_1$ | $T_1$ |
| $B_1$ | 1.0 | 0.8 | 0.5 | 0.0 |
| $B_2$ | 0.8 | 1.0 | 0.8 | 0.5 |
| $B_3$ | 0.5 | 0.8 | 1.0 | 0.8 |
| $B_4$ | 0.0 | 0.5 | 0.8 | 1.0 |

The fuzzy logic operation in accordance with the fuzzy correlation shown in Table 2 is performed as described below.

If the correlation value, $f(T_m, B_n)$, determined at time $T_m$ in Table 2 is greater than 0.8, it is determined as that sensor 30 is operating normally. Otherwise, it is regarded that a problem exists with the sensor 30.

The operation of a control device for combustion apparatus in accordance with the present invention will be described.

When the voltage from power supply 20 is applied to voltage sensor 30, a voltage $V_B$ is obtained at the output of voltage sensor 30 comprising resistor $R_2$, $R_3$ and $R_4$ and a capacitor $C_2$, that is, $V_B = (R_3/(R_2+R_3)) \times (V_{cc} - V_{ss})$. Then, the voltage $V_B$ is applied to the input $V_{AD}$ of microprocessor 10. The user inputs a desired room temperature into microprocessor 10 by means of key input 50, and this temperature is displayed on display 60. When the combustion apparatus operates normally, temperature sensor 40 detects the room temperature over a predetermined time as well as the detected temperature applied to microprocessor 10 through the input $I_1$. Also, the temperature is displayed on display 60 through the output $O_1$.

In accordance with the control rule shown in the Table 1, the voltage and temperature are compared with the voltage and temperature values preset in microcomputer 10. As a result of the comparison, when it is determined that the voltage and the property of temperature sensor 40, e.g., thermistor $R_{TH}$, and any other components have varied, microprocessor 10 applies a control signal to combustion control 70 to control combustion of the combustion apparatus.

For example, when the fuzzy correlation between the temperature variation per unit time, $\Delta T/\Delta t_1:T$, stored in microprocessor 10 and the temperature variation, $\Delta V_{AD}/\Delta t_1:B_1$, detected by temperature sensor 40 at time $t_1$ is 1.0 as shown in Table 2, it is determined that temperature sensor 40 operates normally. However, if the fuzzy correlation between the temperature variation per unit time, $\Delta T/\Delta t_1: T$ and the temperature variation, $\Delta V_{AD}/\Delta t_n:B_4$ at time $t_4$ is 0.5 as shown in Table 2, it is determined that temperature sensor 40 does not operate normally, so the microprocessor 10 outputs the control signal to combustion control 70 to control combustion.

In the conventional combustion apparatus, the current room temperature is measured at the temperature sensor on the basis of a voltage corresponding to the temperature. Thus, when the combustion apparatus does not operate normally due to the variation of voltage supplied to the temperature sensor, or the error thereof, large tolerance or the property variation of the components, such as the thermistor or resistors used in the temperature sensor, an accurate temperature control can be obtained. However, the combustion control in accordance with the present invention is achieved on the basis of a control rule depending upon the change of each controlling step depending upon time and the room temperature variation depending upon the change of controlling step, and by performing fuzzy reasoning according to the fuzzy correlation.

A method for controlling a combustion apparatus according to present invention will be described in conjunction with FIG. 5.

Figure 5:
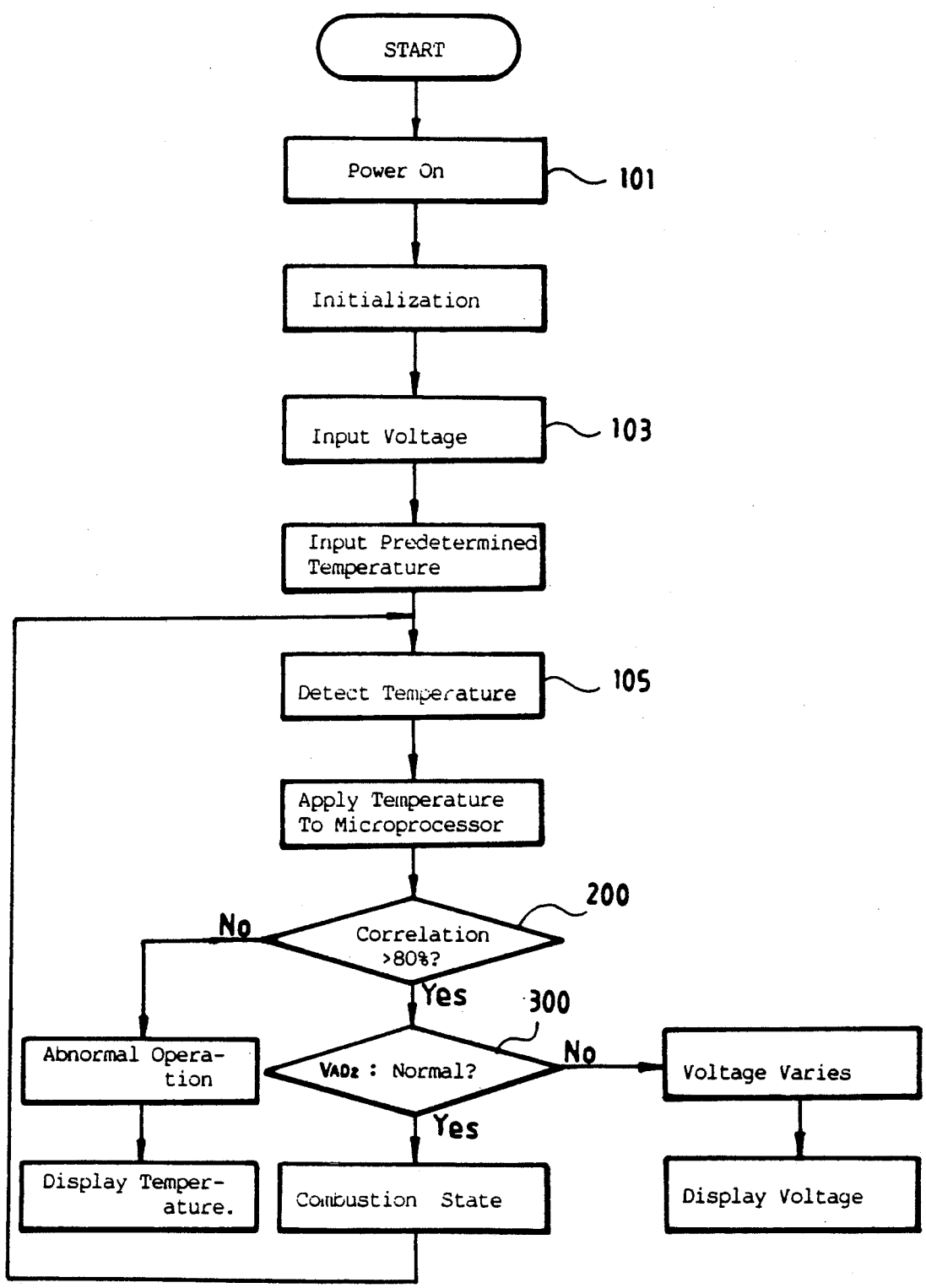
FIG. 5 is a flow diagram showing the control of the combustion apparatus.

In FIG. 5, when the power is applied to the combustion apparatus in step 101, microprocessor 10 is initialized. Also, the voltage from the power source is detected by voltage sensor 30 and the data regarding the voltage is applied to microprocessor 10 in step 103. The user inputs the predetermined temperature into microprocessor 10 by means of key input 20. At this moment, the current room temperature is detected by temperature sensor 40 and then applied to microprocessor 10. Fuzzy reasoning is performed in accordance with the control rule shown in Table 1 and the fuzzy correlation shown in Table 2 and it is determined whether the fuzzy correlation is 80% ($f(T_m, B_n) > 0.8$) in step 200.

As result of the determination, when the fuzzy correlation is more than 80%, that is, when the answer is "yes" at the step 200, it is regarded that the temperature sensor 40 is operating normally. Next, it is determined whether the voltage $V_{AD2}$ applied to the combustion apparatus is in a normal state in step 300. If the voltage is in a normal state, there is no variation in the voltage applied to the combustion apparatus. Accordingly, combustion control 70 maintains combustion state as it is and the process routine returns to step 105.

On the other hand, when the fuzzy correlation is less than 80% at step 200, it is determined that the temperature sensor 40 does not operate normally and this fact is displayed on display 60. Also, in the case that the voltage $V_{AD2}$ applied to the combustion apparatus is not in normal state in step 300, this fact is displayed on display 60. Thus, in the case that the components in the apparatus do not operate normally, it is possible to obtain accurate control of the combustion as well as it is possible to prevent malfunction of combustion apparatus by taking the necessary steps.

It should be noted that the present invention can be applied to all kinds of the apparatus, such as air conditioners, which is used for temperature control.

The foregoing description of the preferred embodiment has been presented for the purpose of illustration and description. It is not intended to limit the scope of this invention. Many modifications and variations are possible in light of the above teaching. It is intended that the scope of the invention be defined by the claims.

What is claimed is:

1. A method for controlling an apparatus, said method comprising the steps of:
    inputting a predetermined temperature value into a microprocessor;
    detecting a voltage value of a power supply;
    determining a variation in voltage from said power supply by comparing the detected voltage from said power supply with a reference voltage value stored in said microprocessor;
    detecting a temperature variation;
    determining a fuzzy correlation by comparing a variation in room temperature stored in said microprocessor with the detected temperature variation over a predetermined time period; and
    displaying an operating state, which corresponds to said variation in voltage or said fuzzy correlation, of the apparatus on a display.

2. The method of claim 1, wherein said apparatus is a combustion apparatus and wherein the variation in temperature stored in said microprocessor is the variation of temperature per unit time at each controlling step of said combustion apparatus.

3. The method of claim 2, wherein said each controlling step can be divided into a plurality of steps from the lowest combustion state to the highest combustion state.

4. A control device for a combustion apparatus, said device comprising:
    memory means for storing reference temperature data and a reference voltage;
    means for measuring temperature;
    means for measuring a voltage supplied to said combustion apparatus; and
    means for controlling combustion based on the measured temperature and the reference temperature data and based on the detected voltage and a reference voltage stored in said memory means.

5. The control device according to claim 4 further including means for displaying the measured temperature and the reference temperature data.

6. A method for controlling a combustion apparatus, said method comprising the steps of:
    storing reference temperature data and a reference voltage;
    measuring temperature;
    detecting a voltage corresponding to a power supplied to said combustion apparatus; and
    controlling combustion based on the measured temperature and the reference temperature data and based on the detected voltage and a reference voltage stored in said processing means.

* * * * *